US011674760B2

(12) United States Patent
Djelassi et al.

(10) Patent No.: US 11,674,760 B2
(45) Date of Patent: Jun. 13, 2023

(54) METHOD AND A SYSTEM FOR REGULATING A TEMPERATURE ASSOCIATED WITH A HEAT EXCHANGER ASSEMBLY OF A TURBINE ENGINE

(71) Applicant: SAFRAN AIRCRAFT ENGINES, Paris (FR)

(72) Inventors: Cedrik Djelassi, Moissy-Cramayel (FR); Pierre Cabrera, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 40 days.

(21) Appl. No.: 17/452,978

(22) Filed: Oct. 29, 2021

(65) Prior Publication Data

US 2022/0049911 A1    Feb. 17, 2022

Related U.S. Application Data

(62) Division of application No. 16/161,242, filed on Oct. 16, 2018, now Pat. No. 11,209,227.

(30) Foreign Application Priority Data

Oct. 20, 2017   (FR) ...................................... 17 59906

(51) Int. Cl.
*F28F 27/02*     (2006.01)
*F02C 6/08*      (2006.01)
(Continued)

(52) U.S. Cl.
CPC .............. *F28F 27/02* (2013.01); *F01D 25/12* (2013.01); *F02C 6/08* (2013.01); *F02C 7/18* (2013.01);
(Continued)

(58) Field of Classification Search
CPC ............ F28F 27/02; F01D 25/12; F02C 6/08; F02C 6/04; F02C 9/18; F05D 2270/112;
(Continued)

(56) References Cited

U.S. PATENT DOCUMENTS 4,430,867 A * 2/1984 Warner .................. B64D 13/06
                                                    62/402
6,305,156 B1   10/2001 Lui
(Continued)

FOREIGN PATENT DOCUMENTS

EP       2 423 488 A2    2/2012
WO      WO 01/23724 A2   4/2001

OTHER PUBLICATIONS

French Preliminary Search Report issued in French Application 17 59906 dated Jun. 28, 2018 (with English Translation of Categories of Cited Documents).

*Primary Examiner* — Joel M Attey
(74) *Attorney, Agent, or Firm* — Oblon, McClelland, Maier & Neustadt, L.L.P.

(57) ABSTRACT

A method of regulating a temperature associated with a heat exchanger assembly of a turbine engine, the method includes, in a single cycle: measuring the temperature of an air stream at the outlet from a heat exchanger; receiving a setpoint temperature for the air stream at the outlet from the heat exchanger; estimating a theoretical temperature for the air stream at the outlet from the heat exchanger as a function of an estimate of the shutter position of a controlled valve bleeding off a cooling air stream for the heat exchanger; determining a correction current from the difference between the measured temperature and the theoretical temperature; and determining a control current for the shutter from the difference between the measured temperature and the setpoint temperature and the correction current determined during the preceding cycle, the shutter position being (Continued)

determined from the control and correction currents determined during the preceding cycle.

5 Claims, 4 Drawing Sheets

(51) Int. Cl.
    *F02C 9/18*     (2006.01)
    *F02C 7/18*     (2006.01)
    *F01D 25/12*     (2006.01)
    *B64D 13/06*     (2006.01)
    *B64D 27/10*     (2006.01)
    *F02C 6/04*     (2006.01)
    *F02C 7/143*     (2006.01)

(52) U.S. Cl.
    CPC ............... *F02C 9/18* (2013.01); *B64D 13/06* (2013.01); *B64D 27/10* (2013.01); *B64D 2013/0618* (2013.01); *F02C 6/04* (2013.01); *F02C 7/143* (2013.01); *F05D 2270/112* (2013.01); *F05D 2270/303* (2013.01); *F05D 2270/44* (2013.01)

(58) Field of Classification Search
    CPC ........... F05D 2270/303; F05D 2270/44; B64D 13/06; B64D 13/0648; B64D 2013/0618; B64D 27/10; C02C 7/18; C02C 7/143
    See application file for complete search history.

(56) References Cited

U.S. PATENT DOCUMENTS

| 2012/0045317 | A1* | 2/2012 | Saladino | F02C 6/08 |
| | | | | 415/145 |
| 2014/0069105 | A1* | 3/2014 | Hoang | F04D 27/0215 |
| | | | | 60/776 |
| 2014/0090458 | A1 | 4/2014 | Gaully et al. | |
| 2015/0354464 | A1* | 12/2015 | Hillel | F04D 27/0261 |
| | | | | 415/144 |

* cited by examiner

METHOD AND A SYSTEM FOR REGULATING A TEMPERATURE ASSOCIATED WITH A HEAT EXCHANGER ASSEMBLY OF A TURBINE ENGINE

CROSS-REFERENCE TO RELATED APPLICATIONS

This application is a division of U.S. application Ser. No. 16/161,242 filed Oct. 16, 2018, the entire contents of which is incorporated herein by reference. U.S. application Ser. No. 16/161,242 claims the benefit of priority from prior French Application No. 17 59906 filed Oct. 20, 2017.

BACKGROUND OF THE INVENTION

The invention relates to the general field of gas turbine aeroengines. It relates more particularly to regulating the feed temperature of an air feed system for an aircraft.

An aircraft, such as an airplane, for example, has a fuselage in which there are provided a cockpit and a passenger cabin, and it also has at least one turbine engine. Such a turbine engine comprises an engine and a fan from which it is possible to bleed off air. Air is bled off by a feed system that has a plurality of valves and a heat exchanger. The valves serve to bleed air from various air streams flowing through the engine, in particular a high-pressure air stream, which is at high temperature, that is taken from a stream of air under pressure from at least one compressor stage of the engine, and a fan air stream, which is cold, taken downstream from the fan, e.g. in a secondary passage in which a cold stream of air flows. The high-pressure air stream and the fan air stream may be delivered to a heat exchanger in order to reduce the temperature of the high-pressure air stream leaving the heat exchanger so as to regulate the temperature of the air that is sent to the airplane system. Another portion of the air that is bled off may be used for feeding deicer systems of the airplane.

Such regulation is obtained by controlling the aperture of one or more air stream bleed valves. The temperature of the air stream can be regulated by selecting one or more valves that are to be controlled, e.g. by controlling their aperture or by closing the fan air stream bleed valve.

A stream of air can also be taken for a cooling system that cools the compartment between the air passages in a bypass jet, which system is known as the "core compartment cooling system". The system has valves for bleeding cooling air from the air stream leaving the fan and a cooling manifold for cooling control members and accessories situated in a central housing of the turbine engine, between the primary stream and the secondary stream.

Generally, the cold air feeding the heat exchanger is bled from the secondary stream downstream from the fan, via a scoop valve of variable inlet section that is referred to as a fan air valve (FAV).

By controlling the angular position of a shutter member of that valve, e.g. made up of one or two pivotable flaps, it is possible to adjust the flow rate of cold air bled off by the FAV for the heat exchanger, and thus to regulate the temperature of the air delivered to the airplane at the outlet from the heat exchanger, where that temperature is generally referred to as the "bleed temperature", in so-called "bleed" regulator systems.

In the example under consideration, the FAV system is constituted by a system of two flaps that are mechanically connected to an electropneumatic control system having an electric torque motor and a pneumatic actuator that serves to open or close the flaps. The actuator is fed with air by the torque motor, which serves to pressurize a feed chamber, the torque motor being fed with a regulated pressure, referred to as the "muscle" pressure.

The regulation performed using the FAV nevertheless raises problems that stem from the valve itself, in particular when such a FAV system does not have means for returning the position of the flaps so as to enable the position of the flaps to be known. Furthermore, dispersion associated with manufacture and dispersion associated with operating conditions give rise to considerable variability in the relationship associating the control currents delivered to the torque motor with the position of the flaps.

The relationship between the flap control current and the position of the flaps in the scoop valve thus presents a large amount of variability, as illustrated in FIG. 1, which is a graph plotting the position of the flaps as a function of the control current.

In the graph of FIG. 1, for a current presenting a value in milliamps corresponding to abscissa position B the flaps may be closed or opened by an amount depending on variation in the relationship as illustrated in the graph by the left and right characteristics for the valve. In other words, the command current to be delivered so that the flaps of the scoop valve are closed can vary or slip from the value corresponding to abscissa position B to the value corresponding to abscissa position C.

As shown in FIG. 1, the current for closing the valve in the extreme left valve characteristic corresponds to the value at which the flaps are open in the extreme right characteristic.

The problem of determining the control current that needs to be sent thus stems directly from this particularity. Specifically, any corrector that possesses an integrator will be constrained to suffer current dead zones.

For example, for a controller associated with a valve having a characteristic as shown on the left in the graph of FIG. 1, and starting from a control current corresponding to the maximum current, i.e. having a value corresponding to abscissa position C, then the control regulator will be saturated and the scoop valve closed in application of the control relationship. If it is necessary to open the scoop valve in order to regulate the air temperature for the bleed system, the control device needs to reach a current that presents a value corresponding to abscissa position B in order to begin to see the valve move. The gains in the corrector cannot be matched to the position of the valve since that position is unknown, which leads to passing very slowly through the dead zone of the scoop valve. This implies regulation with a very slow response time.

The regulators recommended in the prior art for this type of control are generally proportional integral derivative (PID) type correctors.

Document FR 2 978 123 discloses a system for managing air bleed in such a bleed system by controlling a scoop-type FAV. The system described in that document manages temperature information supplied by probes in a particular manner but it does not describe regulation.

A control device or controller is also known having a linear-quadratic regulator for controlling an FAV including an actuator. The controller sends position control signals to the actuator, but it does not take account of the variability in a control relationship of the signal as a function of the position of the flaps of the FAV.

Also known, from Document FR 3 040 220, is a system for regulating a regulated parameter of an aviation equipment device, the regulated parameter being governed by an operating relationship.

OBJECT AND SUMMARY OF THE INVENTION

The invention seeks to mitigate the above drawbacks, and in particular the variability of the relationship associating control current with the position of the flaps in the controlled valve, where such variability of the relationship gives rise to control dead zones. The invention mitigates that drawback by providing a regulator that adapts to the dead zones of the controlled valve.

The invention firstly provides a regulation method for regulating a temperature associated with a heat exchanger assembly of a turbine engine, the method being for implementing in a regulator system that comprises at least one measurement means for measuring said temperature, a valve controlled electrically by a control unit, the valve having a shutter configured to vary the flow rate of a fluid passing through said heat exchanger assembly in order to influence said temperature, the heat exchanger assembly further comprising a heat exchanger having connected at a first inlet a first pipe bleeding off a first air stream and at a second inlet a second pipe bleeding off a second air stream with the help of the valve, the temperature of the second air stream at the second inlet to the heat exchanger being lower than the temperature of the first air stream at the first inlet to the heat exchanger, and the heat exchanger being suitable for lowering the temperature of the first air stream at a first outlet from the heat exchanger by heat exchange with the second air stream.

According to a general characteristic of the invention, the method comprising that during a single regulation cycle, the following steps:

measuring the temperature of the first air stream at the first outlet from the heat exchanger;

receiving a setpoint temperature for the first air stream at the first outlet from the heat exchanger;

estimating in real time a theoretical temperature for the first air stream at the first outlet from the heat exchanger as a function in particular of an estimate of the position of the shutter of the valve;

calculating a first temperature difference between the measured temperature and the estimated theoretical temperature;

on the basis of the calculated first temperature difference, determining a correction current for correcting a control current from the control unit for controlling the valve;

determining a second temperature difference between the measured temperature and the setpoint temperature; and on the basis of the second temperature difference as determined, determining a control current for opening the shutter of the valve while taking account of the correction current determined during the preceding cycle;

the position of the shutter of the valve being determined from the control current and the correction current as determined during the preceding cycle.

The theoretical temperature corresponds to the temperature that ought to exist at the first outlet from the heat exchanger given the operating conditions of the heat exchanger assembly and of the turbojet within which the heat exchanger assembly is mounted. The theoretical temperature depends directly on the relationships associating the current delivered to the valve with the position of the shutter of the valve. The shutter of the valve may be formed by at least one flap, for example.

When the shutter of the valve is formed by two flaps, the control current is delivered to the torque motor of the valve that actuates the actuator that serves to modify the position of the flaps. Identifying the theoretical temperature in real time makes it possible in real time to identify the real characteristic of the actuator, i.e. of the assembly comprising the valve and its electropneumatic control system including the actuator and the torque motor, and thus to identify any departure of the relationship associating the control current for the valve with the position of the flaps of the valve, referred to below as the current/position relationship. This thus makes it possible to have knowledge about the dead zones in this relationship and therefore to adapt the control and in particular the current setpoint to be delivered to the valve.

The regulation loop as created in this way has the effect of shifting the characteristic of the current/position relationship so as to tend to eliminate the error between the theoretical temperature and the measured temperature, thus making it possible in real time to identify the real current/position relationship of the valve.

In a first aspect of the regulation method, the correction current may be determined by amplifying the first calculated temperature difference by a gain and by integrating the amplified first temperature difference.

The convergence gain is set by testing so as to adjust the speed with which identification converges while avoiding instabilities in the estimate. Integration of the estimate is saturated in order to avoid the identification diverging. The saturation values are deduced from maximum ranges for dispersion in the current/position relationship of the real system.

By determining the temperature difference, it is possible to reset the dead zones for the control current of the valve, thus enabling the integrator of the corrector to be saturated and avoiding saturation of the integrator of the temperature regulator, which would lead to the problem of slow response.

In a second aspect of the regulation method, the theoretical temperature results from adding together a static component and a dynamic component:

the static component resulting from the temperature of the first air stream at the first inlet to the heat exchanger to which a regulation term has been added, the regulation term being determined from the product of the efficiency of the heat exchanger multiplied by an inlet temperature difference calculated by subtracting the value of the temperature of the second air stream at the second inlet to the heat exchanger from the value of the temperature of the first air stream at the first inlet to the heat exchanger; and the dynamic component corresponding to a first order lowpass function in which the time constant varies as a function of the efficiency of the heat exchanger and of the flow rate of the first air stream at the first inlet to the heat exchanger.

In a third aspect of the regulation method, the efficiency of the heat exchanger depends on the flow rate of the second air stream at the second inlet to the heat exchanger and on the flow rate of the first air stream at the first inlet to the heat exchanger, the method further comprising measuring the flow rate of the first air stream at the first inlet to the heat exchanger and determining the flow rate of the second air stream from a maximum value for the flow rate of the second air stream when the shutter of the valve is fully open and from a factor that depends on the position of the shutter of the valve.

In a fourth aspect of the regulation method, the maximum flow rate of the second air stream is determined from the product of a function depending on the ratio of the pressure of the second air stream at the second inlet to the heat exchanger divided by the pressure of the second air stream at the second outlet from the heat exchanger multiplied by the ratio of said pressure of the second air stream at the second inlet to the heat exchanger divided by the square root of the temperature of the second air stream at the second inlet to the heat exchanger.

In a fifth aspect of the regulation method, the control current is saturated at a maximum value or a minimum value as a function of said second temperature difference, the maximum saturation value and the minimum saturation value depending on the correction current.

More precisely, the integral control of the temperature corrector is saturated in order to avoid the control current departing from the zone that is useful for control. The temperature corrector may correspond to a control module delivering a control current that may for example be implemented in the form of a proportional integral corrector. For example, for a valve having the extreme left characteristic (reference g in FIG. 1), the useful control current zone is defined by the current corresponding to abscissa position A (minimum saturation) and to abscissa position B (maximum saturation). Specifically, a control current greater than the current corresponding to abscissa position B for a valve having the extreme left characteristic would have no effect on the position of the valve, since the valve would already be closed.

Saturation thus makes it possible to avoid overloading the integrator of said control module. The saturation values are calculated from the correction current determined by a correction module. The correction module, constituted by amplifying and then integrating the error between the measured temperature and the modeled temperature serves to calculate the value of the abscissa offset of the theoretical current/voltage relationship in order to obtain the real current/voltage relationship. This correction current added to the theoretical values of the current corresponding to the fully open and the fully closed positions (in the example shown the current values corresponding to abscissa position A (minimum saturation) and to abscissa position B (maximum saturation)) makes it possible to recalculate the currents that correspond to a fully open position and to a fully closed position of the real valve. Once deduced in this way, these values serve to put bounds on the integral correction coming from the control module, thus preventing drifts that would penalize response time.

The invention also provides a regulator system for regulating a temperature associated with a heat exchanger assembly of a turbine engine, the regulator system including a heat exchanger having connected thereto as input a first pipe bleeding off a first air stream under pressure downstream from a compression stage of the turbine engine and a second pipe bleeding off via a controlled valve a second air stream formed by air bled off downstream from a fan of the turbine engine, the temperature of the second air stream at the second inlet to the heat exchanger being less than the temperature of the first air stream at the first inlet to the heat exchanger, the heat exchanger being suitable for lowering the temperature of the first air stream at the first outlet from the heat exchanger by exchanging heat with the second air stream, said valve including a shutter of position that can be controlled by a control unit that is electrical at least in part to vary the flow rate of an air stream passing through said heat exchanger assembly in order to influence said temperature.

According to a general characteristic of the system of the invention, the control unit of the valve comprises:

a temperature sensor for measuring the temperature of the first air stream at the first outlet from the heat exchanger;

an estimator module for estimating a theoretical temperature for the first air stream at the first outlet from the heat exchanger as a function, in particular, of an estimate of the position of the shutter of the valve;

a first subtracter configured to calculate a first temperature difference between the measured temperature and the estimated theoretical temperature;

a correction module configured to use the first calculated temperature difference to determine a correction current;

a second subtracter configured to calculate a second temperature difference between the measured temperature and a setpoint temperature for the first air stream at the first outlet from the heat exchanger; and control means configured to use the second temperature difference to deliver a control current for controlling the shutter of the valve while taking account of the correcting current;

the estimator module including a determination module for determining the position of the shutter of the valve from the control current and from the correction current.

In a first aspect of the regulator system, said at least one said controlled valve is a scoop valve of variable inlet section.

In a second aspect of the regulator system, the control unit further comprises a flow rate sensor mounted in the first pipe, a temperature sensor mounted in the second pipe, and a module for determining the flow rate of the second air stream on the basis of a value for the maximum flow rate of the second air stream when the shutter of the valve is fully open and from a factor depending on the position of the shutter of the valve.

The invention also provides an aircraft turbine engine including at least one regulator system as defined above.

The invention also provides an aircraft including at least one turbine engine as defined above.

BRIEF DESCRIPTION OF THE DRAWINGS

The invention can be better understood on reading the following description given by way of non-limiting indication and with reference to the accompanying drawings, in which.

DETAILED DESCRIPTION OF EMBODIMENTS

Figure 1:
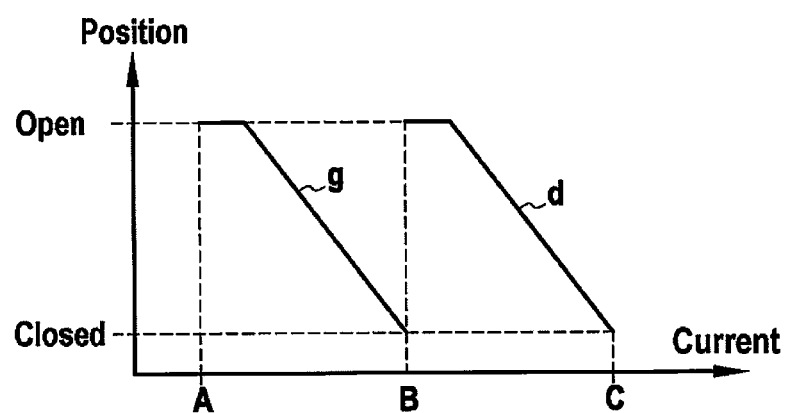
FIG. 1, described above, is a graph plotting the position of the flaps as a function of the control current in the prior art.
Figure 2:
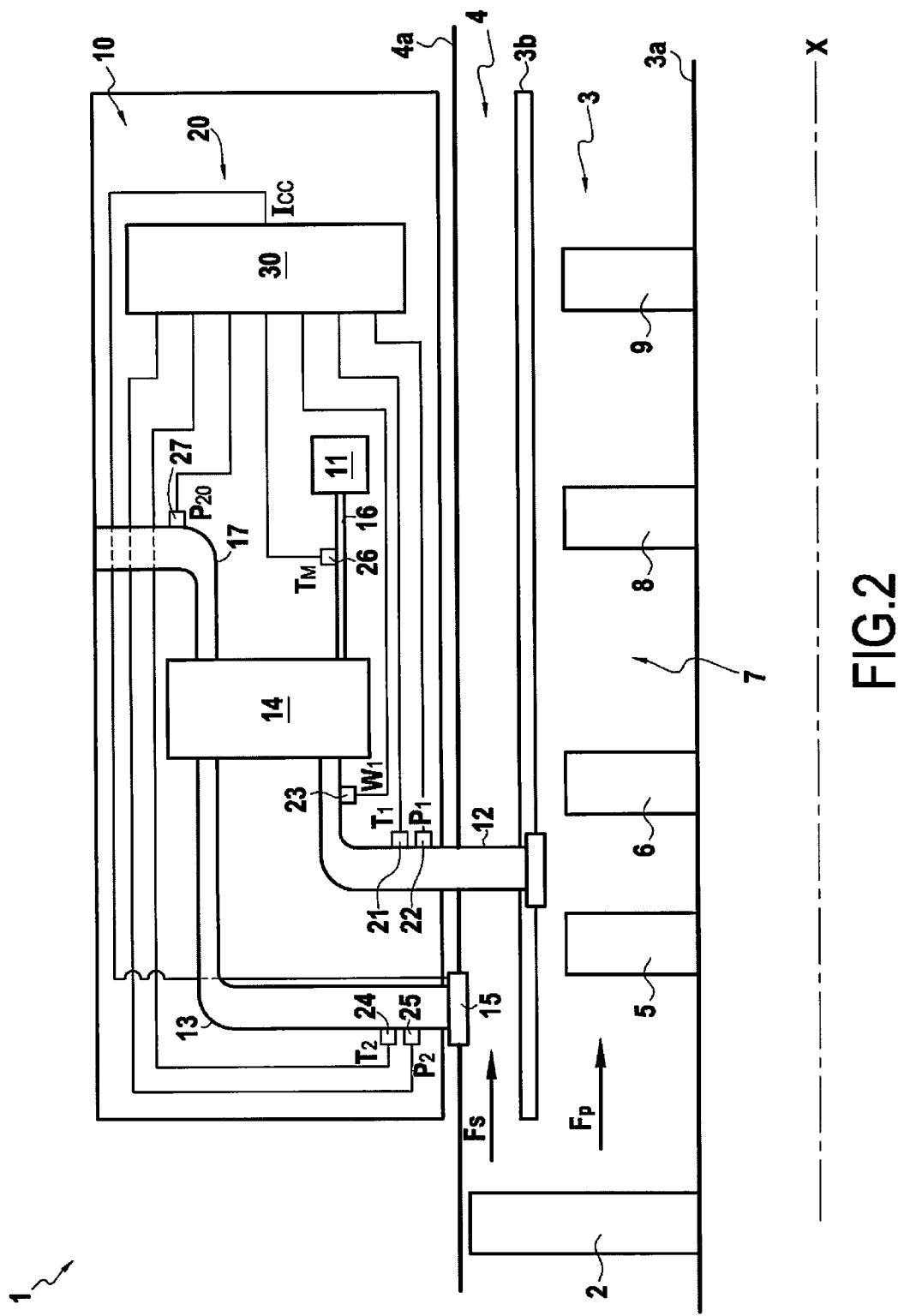
FIG. 2 is a diagram of a turbine engine having a heat exchanger assembly in an embodiment of the invention.

FIG. 2 is a diagram showing an aircraft turbine engine 1 having a heat exchanger assembly for an air stream in an embodiment of the invention.

The turbojet 1 is of the two-spool bypass type and presents a longitudinal axis X-X. The turbojet includes in a particular a fan 2 that delivers an air stream that is split into a primary stream $F_P$ flowing through a primary passage 3 for passing the flow of the primary stream $F_P$, and a secondary stream $F_S$ flowing through a secondary passage 4 for passing the flow of the secondary stream $F_S$, which secondary passage is coaxial around the primary passage 3. The primary passage 3 extends between a central shroud 3a and a compartment 3b between the passages, and the secondary passage 4 extends between that compartment 3b and an outer shroud 4a. From upstream to downstream in the flow direction of the primary stream $F_P$, the primary passage 3 has a low-pressure compressor 5, a high-pressure compressor 6, a combustion chamber 7, a high-pressure turbine 8, and a low-pressure turbine 9.

The turbojet 1 has a heat exchanger assembly 10. The heat exchanger assembly 10 comprises a bleed system for bleeding a hot air stream and a cold air stream, the assembly being configured to cool the hot air with the cold air and to supply as output from the heat exchanger assembly cooled air that is regulated on a temperature and a pressure that are desired for installations 11 of the aircraft and/or of the turbine engine that make use of such air, such as for example the installation for air conditioning the aircraft cabin, the installation for deicing aerodynamic surfaces of the turbine engine, etc.

The heat exchanger assembly 10 has a hot air bleed pipe 12, a cold air bleed pipe 13, a heat exchanger 14, a controlled valve 15, a regulated hot air exhaust pipe 16, and a cooling air exhaust pipe 17.

The hot air bleed pipe 12 opens out into the primary passage 13. It connects the low-pressure compression stage 5 of the turbojet 1 to the first inlet of the heat exchanger 14. The cold air bleed pipe 13 opens out into the secondary passage 4. It puts the secondary passage 4 that receives the secondary stream $F_S$ as delivered by the fan 2 into communication with the heat exchanger 14. The heat exchanger 14 thus has cold air coming from the fan 2 passing transversely therethrough in order to cool the hot air bled from the compressor stage 4 and flowing through the heat exchanger 14 from the first inlet to the first outlet.

The controlled valve 15, of the scoop valve type, is mounted on the air intake provided in the compartment 3b between passages in order to bleed the cooling air stream from the secondary passage 4. The valve 15 has mechanical flaps that are actuated by an actuator controlled by a torque motor.

The regulated hot air exhaust pipe 16 connects the heat exchanger 14 to the installations 11 and it conveys a stream of regulated hot air to the installations 11. The regulated hot air exhaust pipe 16 and the hot air bleed pipe 12 form a first duct in which the hot air flows.

The cooling air exhaust pipe 17 connects the heat exchanger 14 to the secondary passage 4 and it conveys a stream of heated cooling air to the secondary passage 4. The cooling air exhaust pipe 17 and the cold air bleed pipe 13 form a second duct in which cold air flows. The first and second ducts are not in fluid flow communication, i.e. the air that flows in one of these ducts does not mix with the air flowing in the other duct. The first and second ducts interact with each other thermally in the heat exchanger 14 so as to allow the cold air flowing in the second duct to cool the hot air flowing in the first duct.

The valve 15, and more particularly the torque motor of the electropneumatic control system for the valve 15 in the assembly under consideration is controlled by a control unit 20. Nevertheless, the system for controlling the valve 15 need not necessarily be electropneumatic, and it is possible to envisage not using a pneumatic valve by having an electrohydraulic actuator or indeed an actuator that is electrical only, e.g. a stepper motor, likewise controlled by a control unit analogous to the unit 20.

The control unit 20 has a first temperature sensor 21, a first pressure sensor 22, and a flow rate sensor 23, all three of which are mounted in the hot air pipe 12, and a second temperature sensor 24 and a second pressure sensor 25, both of which are mounted in the cooling air pipe 13. The measurements supplied by the sensors 21 to 25 may be replaced by models calculated on the basis of measurements that are already used in the turbine engine. For example, the temperature and pressure sensors downstream from the high-pressure compressor, and as are conventionally used for regulating turbine engines, can also serve to estimate the temperature $T_1$ and the pressure $P_1$ in the hot air pipe 12. Likewise, the second temperature and pressure sensors 24 and 25 measuring the temperature and the pressure $T_2$ and $P_2$ in the cooling pipe 13 may be replaced by models calculated on the basis of measurements already used in the turbine engine, in particular temperature and pressure sensors upstream from the fan and from the speed of rotation of the fan. A third temperature sensor 26 is mounted at the first outlet from the heat exchanger 14 on the regulated hot air exhaust pipe 16 feeding the installations 11, and a third pressure sensor 27 is mounted at the second outlet of the heat exchanger 14 on the cooling air exhaust pipe 17. In this embodiment, the exhaust from the cold pass goes to ambient air, and the third sensor 27 is an atmospheric pressure sensor that is also used for regulating the turbine engine.

The first temperature sensor 21, the first pressure sensor 22, and the flow rate sensor 23 are configured respectively to measure the temperature $T_1$, the pressure $P_1$, and the flow rate $W_1$ of the hot air stream bled by the hot air pipe 12 from the low-pressure compression stage 5. The second temperature sensor 24 and the second pressure sensor 25 are configured to measure respectively the temperature $T_2$ and the pressure $P_2$ of the air stream bled by the cooling air pipe 13 from the secondary passage 4 downstream from the fan 2. The temperature sensor 26 is configured to measure the temperature $T_M$ of the regulated hot air stream delivered at the first outlet from the heat exchanger 14. The second pressure sensor 27 is configured to measure the pressure $P_{20}$ of the cooling air stream at the second outlet from the heat exchanger 14.

The control unit also has a regulator 30 for regulating the valve 15.

Figure 3:
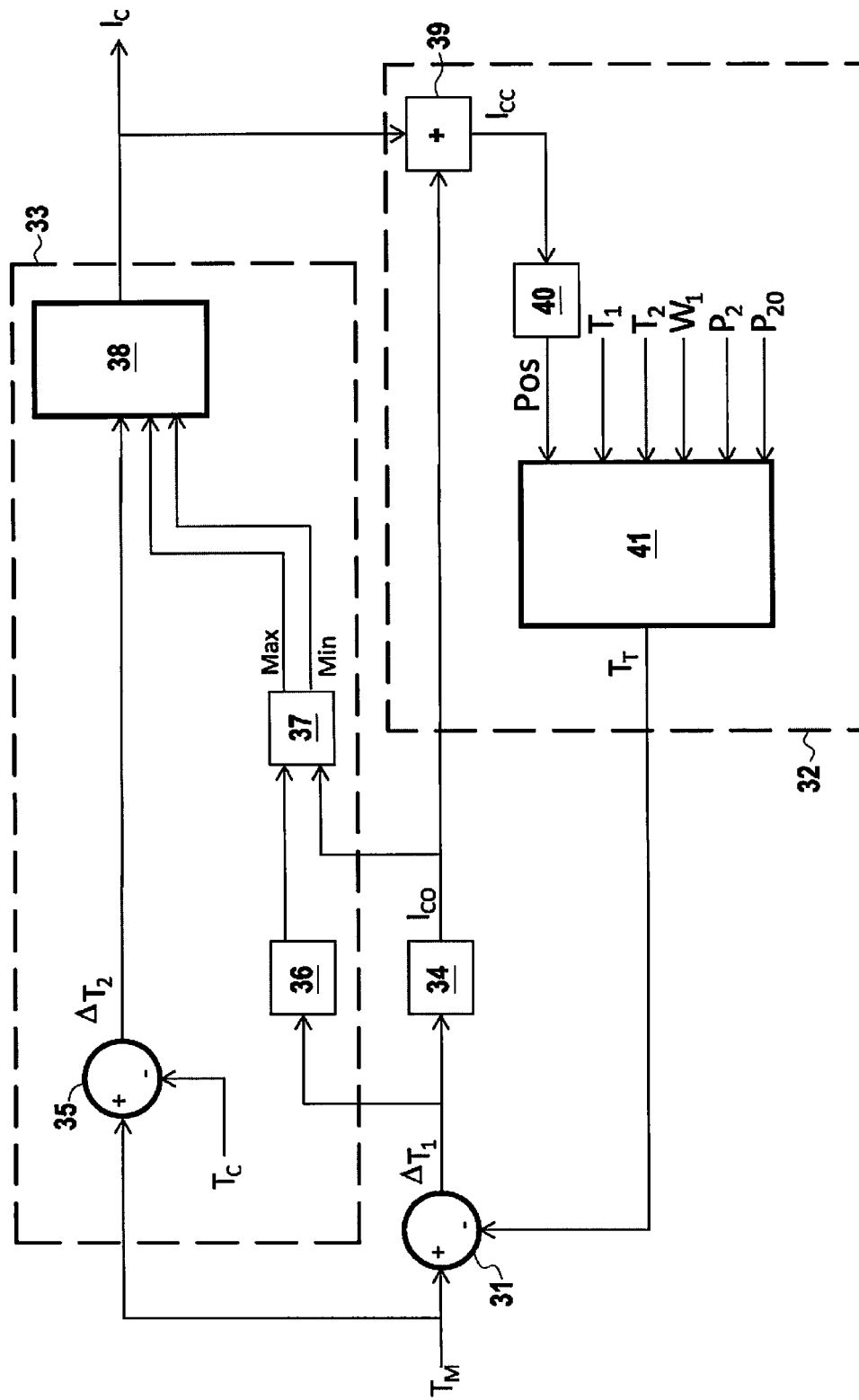
FIG. 3 is a diagram of a regulator of a control unit in an embodiment of the invention.

As shown diagrammatically in FIG. 3, which is a block diagram of the regulator 30 of the control unit 20 of FIG. 2, the regulator 30 has a first subtracter 31 and an estimator module 32 for estimating a theoretical temperature $T_T$ of the hot air stream regulated by the heat exchanger 14. The first subtracter 31 receives as input a measurement of the real temperature $T_M$ at the first outlet from the heat exchanger 14 as delivered by the temperature sensor 26, and also the theoretical temperature $T_T$ as delivered by the estimator module 32. The first subtracter 31 is configured to determine a first temperature difference $\Delta T_1$ between the measured temperature $T_M$ and the theoretical temperature $T_T$.

The regulator 30 also has control means 33 configured to deliver a current setpoint $I_C$ for controlling the opening of the flaps of the valve 15, and a correction module 34 configured to determine a correction current $I_{CO}$ as a function of the first temperature difference $\Delta T_1$.

The correction module 34 delivers a current signal depending on the first temperature difference $\Delta T_1$ as delivered by the first subtracter 31, on an amplifier configured to apply a gain K to the current signal from the converter, and on an integrator receiving the amplified current. The integrator outputs a correction current $I_{CO}$.

As shown in FIG. 3, the control means 33 comprise a second subtracter 35, a convergence detector module 36, a saturation calculation module 37, and a control module 38.

The second subtracter 35 receives as input the measurement of the real temperature $T_M$ at the first outlet from the heat exchanger 14 as delivered by the temperature sensor 26, together with a temperature setpoint $T_C$ corresponding to the temperature desired for the regulated hot air stream at the first outlet from the heat exchanger 14, i.e. the hot air stream flowing in the regulated hot air exhaust pipe 16. The second subtracter 33 is configured to determine a second temperature difference $\Delta T_2$ between the measured temperature $T_M$ and the setpoint temperature $T_C$.

The convergence detector module 36 receives as input the first temperature difference $\Delta T_1$ as delivered by the first subtracter 31 and compares it with a convergence threshold. The convergence detector module 36 is configured to output a binary signal indicating whether convergence between the measured real temperature $T_M$ and the theoretical temperature $T_T$ has been reached, i.e. whether the theoretical temperature $T_T$ is close enough to the measured temperature. This indicates that the current/position relationship has been reset.

The saturation calculation module 37 receives as input the binary signal indicating whether temperature convergence has been achieved between the theoretical temperature $T_T$ and the measured temperature $T_M$, and also the correction current $I_{CO}$ delivered by the correction module 34. The air saturation module 37 is configured to output a minimum control current saturation value Min and a maximum control current saturation value Max, these values being for saturating the control current $I_C$ so as to avoid any control divergence associated with the integrator of the corrector network.

The control module 38, which may for example be made using a proportional integral corrector, receives as input the second temperature difference $\Delta T_2$ as delivered by the second subtracter 35, together with the minimum and maximum saturation values Min and Max delivered by the saturation module 37.

As shown in FIG. 3, the estimator module 32 of the regulator 30 has an adder 39 configured to deliver a corrected control current $I_{CC}$ corresponding to the sum of the control current $I_C$ delivered to the valve 15 by the control module 33 plus the correction current $I_{CO}$ delivered by the correction module, a determination module 40 for determining the position of the flaps of the valve 15 as a function of the corrected control current $I_{CC}$ as delivered by the adder 39, and a modeling block 41 for modeling the theoretical temperature $T_T$.

The determination block 40 outputs a corrected theoretical position Pos for the flaps of the valve 15, which is delivered to the modeling block 41 for modeling the theoretical temperature $T_T$, which block also receives as input the temperature $T_1$ of the hot air stream at the first inlet to the heat exchanger 14, the flow rate $W_1$ of the hot air stream at the first inlet to the heat exchanger 14, the temperature $T_2$ of the cooling air stream bled by the valve 15, the pressure $P_2$ of the cooling air stream at the second inlet to the heat exchanger 14, and the pressure $P_{20}$ of the cooling air stream at the second outlet from the heat exchanger 14.

The modeling block 41 calculates the theoretical temperature $T_T$ of the regulated hot air stream at the first outlet from the heat exchanger 14 by adding together a static component $T_{Cstat}$ and a dynamic component.

The static component $T_{Cstat}$ results from the sum of the temperature $T_1$ of the hot air stream as bled off plus a regulation term, the regulation term being determined as the product of the efficiency $\varepsilon$ of the heat exchanger 14 multiplied by an input temperature difference calculated by subtracting the temperature value $T_2$ of the cooling air stream from the temperature $T_1$ of the bled-off hot air stream. The static component is thus calculated using the following equation:

$$T_{Cstat} = \varepsilon \cdot (T_2 - T_1) + T_1$$

The dynamic component corresponds to a first order lowpass function having a time constant $\tau$ that varies as a function of the efficiency $\varepsilon$ of the heat exchanger 14 and of the flow rate of the bled-off hot air stream.

The efficiency $\varepsilon$ of the heat exchanger 14 is known and depends on the flow rate $W_2$ of the cooling air and the flow rate $W_1$ of the bled-off hot air. At the first inlet to the heat exchanger 14, the flow rate $W_1$ of the hot air bled from the primary stream $F_P$ by the hot air pipe 12 is measured using the flow rate sensor 23, while the flow rate $W_2$ of cooling air is determined by the modeling block 39 from a value for the maximum cooling air flow rate when the flaps of the valve are fully open and a factor that depends on the position of flaps of the valve.

The maximum cooling air flow rate is determined by characterizing the system by testing, and it depends on the product of a function depending on the ratio between the pressure $P_2$ of the cooling air stream at the second inlet to the heat exchanger 14 and the pressure $P_{20}$ of the cooling air stream at the second outlet from the heat exchanger 14, multiplied by the ratio between said second inlet pressure and the square root of the temperature of the cooling air stream at the second inlet to the heat exchanger.

Figure 4:
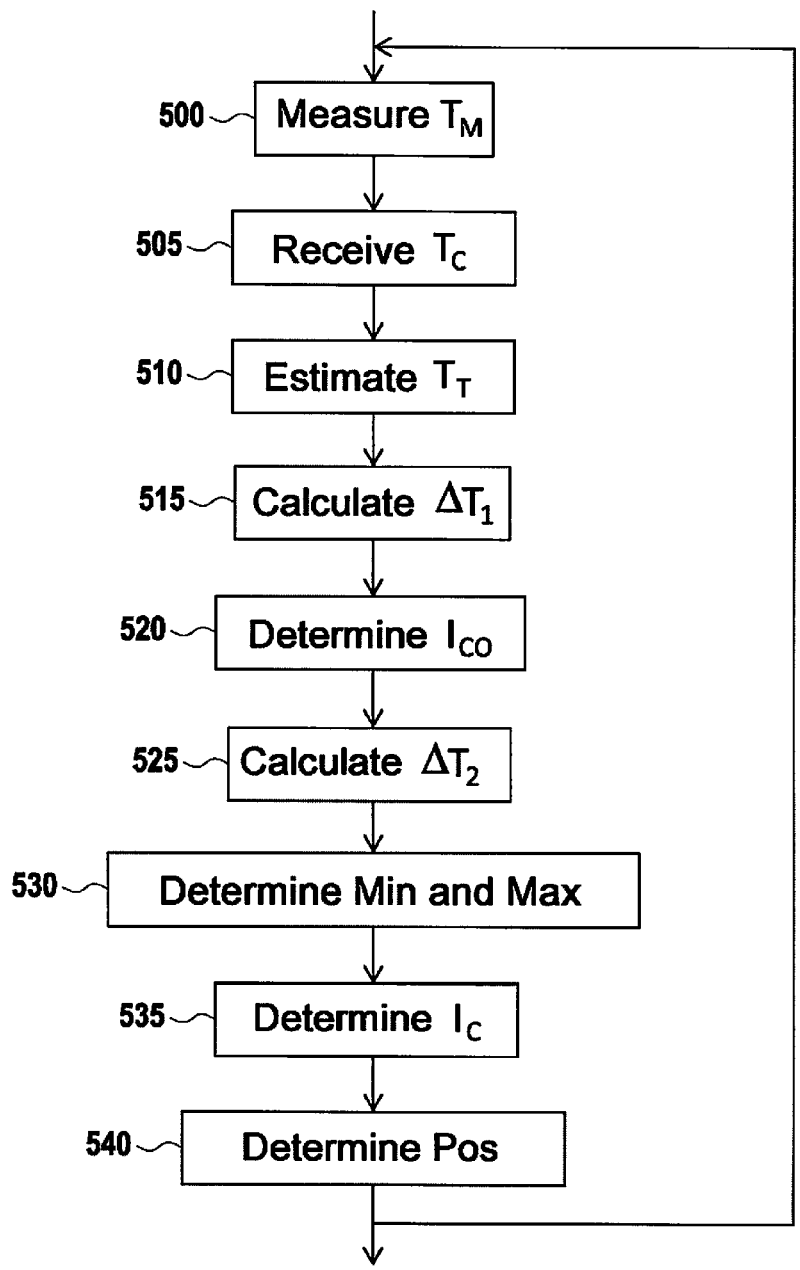
FIG. 4 is a flow chart of a control method in an implementation of the invention.

FIG. 4 is a flow chart of a method of regulating the temperature at the first outlet from the heat exchanger 14 of the heat exchanger assembly 10 of FIGS. 2 and 3, in an implementation of the invention.

In a first step 500, the temperature sensor 26 of the control unit 20 measures the temperature $T_M$ of the gas stream flowing in the regulated hot air exhaust pipe 16.

In a following step 505, the control means 33 receive a temperature setpoint $T_C$ corresponding to the temperature desired for the regulated hot air stream at the first outlet from the heat exchanger 14.

In a following step 510, the estimator module 32 of the regulator 30 of the control unit 20 determines a theoretical temperature $T_T$ corresponding to the position of the flaps of the valve 15, with the position of the flaps taken into account for calculating the theoretical temperature $T_T$ in this cycle of the method corresponding to the position as determined during the preceding cycle, where a cycle corresponds to performing steps 500 to 530 of the method.

In a following step 515, the first subtracter 31 calculates the first temperature difference $\Delta T_1$ between the temperature $T_M$ measured in the preceding step 500 and the theoretical temperature $T_T$ estimated in the preceding step 510.

In a following step 520, the correction module 34 determines the correction current $I_{CO}$ from the first temperature difference $\Delta T_1$ calculated in the preceding step 515.

In the following step 525, the second subtracter 35 calculates the second difference $\Delta T_2$ existing between the temperature $T_M$ measured in the preceding step 500 and the setpoint temperature $T_C$ received in step 505.

In a following step 530, the saturation calculation module 37 calculates a minimum saturation value and a maximum saturation value Min and Max for the control current $I_C$.

In a following step 535, the control module 38 delivers a control current $I_C$ to control the opening of the flaps of the valve 15 on the basis of the second temperature difference $\Delta T_2$ calculated in the preceding step 525 of this cycle and the minimum and maximum saturation values Min and Max determined by the saturation calculation module 37 in a preceding cycle.

In a following step 540, the determination block 40 of the estimator module 32 determines a position for the flaps of the valve 15 on the basis of the corrected control current $I_{CC}$ corresponding to the sum of the control current $I_C$ plus the correction current $I_{CO}$.

The method then loops back to the initial step 500, with the theoretical temperature $T_T$ then being estimated with a new position of the valve as determined from the corrected control current.

The invention makes it possible to provide a unit for controlling regulation of the temperature of the stream that has been bled off, which unit serves to compensate for the control current dead zone in the control relationship for the controlled valve.

The invention claimed is:

1. A regulator system for regulating a temperature associated with a heat exchanger assembly of a turbine engine, the regulator system including a controlled valve, a heat exchanger having connected thereto as input a first pipe bleeding off a first air stream under pressure downstream from a compression stage of the turbine engine, and a second pipe bleeding off via the controlled valve a second air stream formed by air bled off downstream from a fan of the turbine engine, the temperature of the second air stream at the inlet to the heat exchanger being less than the temperature of the first air stream at the inlet to the heat exchanger, the heat exchanger being suitable for lowering the temperature of the first air stream at an outlet from the heat exchanger by exchanging heat with the second air stream, and said valve including a shutter that can be controlled electrically by a control unit to vary the flow rate of an air stream passing through said heat exchanger assembly in order to influence said temperature;

the system being characterized in that the control unit for the valve comprises:
a temperature sensor for measuring the temperature of the first air stream at the outlet from the heat exchanger;
an estimator module for estimating a theoretical temperature for the first air stream at the outlet from the heat exchanger as a function, amongst others, of an estimate of the position of the shutter of the valve;
a first subtracter configured to calculate a first temperature difference between the measured temperature and the estimated theoretical temperature;
a correction module configured to use the first calculated temperature difference to determine a correction current for correcting a control current from the control unit for the valve;
a second subtracter configured to calculate a second temperature difference between the measured temperature and a setpoint temperature for the first air stream at the outlet from the heat exchanger; and
a control means configured to use the second temperature difference to deliver a control current for controlling the shutter of the valve while taking account of the correcting current;
the estimator module including a determination module for determining the position of the shutter of the valve from the control current and from the correction current.

2. A regulator system according to claim 1, wherein said controlled valve is a scoop valve of variable inlet section.

3. A regulator system according to claim 1, wherein the control unit further comprises a flow rate sensor mounted in the first pipe, a temperature sensor mounted in the second pipe, and a module for determining the flow rate of the second air stream at the inlet to the heat exchanger on the basis of a value for the maximum flow rate of the second air stream at the inlet to the heat exchanger when the shutter of the valve is fully open and from a factor depending on the position of the shutter of the valve.

4. An aircraft turbine engine, characterized in that it includes at least one regulator system according to claim 1.

5. An aircraft including at least one turbine engine according to claim 4.

* * * * *